(12) United States Patent
Chiu et al.

(10) Patent No.: US 9,442,666 B2
(45) Date of Patent: *Sep. 13, 2016

(54) OPTIMIZED MANAGEMENT OF OPERATION DATA IN A SOLID-STATE MEMORY

(71) Applicant: Western Digital Technologies, Inc., Irvine, CA (US)

(72) Inventors: Lyndon S. Chiu, Irvine, CA (US); Jerry Lo, San Gabriel, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/048,565

(22) Filed: Feb. 19, 2016

(65) Prior Publication Data

US 2016/0170674 A1 Jun. 16, 2016

Related U.S. Application Data

(63) Continuation of application No. 12/974,234, filed on Dec. 21, 2010, now Pat. No. 9,268,646.

(51) Int. Cl.
*G06F 12/16* (2006.01)
*G06F 3/06* (2006.01)
*G06F 11/14* (2006.01)

(52) U.S. Cl.
CPC ............ *G06F 3/0619* (2013.01); *G06F 3/065* (2013.01); *G06F 3/0685* (2013.01); *G06F 11/1448* (2013.01); *G06F 11/1469* (2013.01)

(58) Field of Classification Search
CPC ......... G06F 11/1435; G06F 11/1446–11/1451
See application file for complete search history.

(56) References Cited

U.S. PATENT DOCUMENTS

| 2006/0218435 | A1* | 9/2006 | van Ingen | G06F 11/1451 714/6.12 |
| 2009/0327589 | A1* | 12/2009 | Moshayedi | G06F 11/1441 711/103 |

* cited by examiner

*Primary Examiner* — Adam M Queler
*Assistant Examiner* — Nicholas Simonetti
(74) *Attorney, Agent, or Firm* — Wilmer Cutler Pickering Hale and Dorr LLP

(57) ABSTRACT

Embodiments of the invention are directed to optimizing reconstruction of operation data in volatile memory of solid-state storage subsystems. In various embodiments, operation data is stored in the volatile memory with persistent backup data of the operation data in the non-volatile memory. In one embodiment, operation data includes a superblock table that is used to identify most or all groups of blocks (superblocks) within the storage device that certain firmware components operate on. Sometimes operation data in the volatile memory is lost or corrupted due to a power interruption or system shutdown. To optimize the reconstruction of the superblock table or other similar operation data in the volatile memory, embodiments of the invention use a "snapshot entry" to identify the latest entry information, allowing the controller to quickly identify the most updated physical locations of the operation data portions and complete the reconstruction in an efficient manner.

20 Claims, 5 Drawing Sheets

IN NON-VOLATILE MEMORY

| PCN | DATA | | | | | Spare Area |
|---|---|---|---|---|---|---|
| 0 | SuperBlock DATA A | | | | | A |
| 1 | SuperBlock DATA B | | | | | B |
| 2 | SuperBlock DATA C | | | | | C |
| 3 | SuperBlock DATA D | | | | | D |
| 4 | SuperBlock DATA E | | | | | E |
| 5 | 0 | 1 | 2 | 3 | 4 | Snapshot signature |
| 6 | SuperBlock DATA D | | | | | D |
| 7 | SuperBlock DATA A | | | | | A |
| 8 | 7 | 1 | 2 | 6 | 4 | Snapshot signature |
| 9 | SuperBlock DATA A | | | | | A |
| 10 | SuperBlock DATA C | | | | | C |

IN VOLATILE MEMORY

| SuperBlock DATA A | 9 |
|---|---|
| SuperBlock DATA B | 1 |
| SuperBlock DATA C | 10 |
| SuperBlock DATA D | 6 |
| SuperBlock DATA E | 4 |

*FIG. 2B*

OPTIMIZED MANAGEMENT OF OPERATION DATA IN A SOLID-STATE MEMORY

CROSS-REFERENCE TO RELATED APPLICATION

This application is a continuation application of U.S. application Ser. No. 12/974,234, filed Dec. 21, 2010, entitled "SYSTEM AND METHOD FOR OPTIMIZED MANAGEMENT OF OPERATION DATA IN A SOLID-STATE MEMORY," which is expressly incorporated herein by reference in its entirety.

BACKGROUND

Solid-state storage subsystems execute many commands in the course of their normal operation. In the course of processing these commands, the storage subsystems need to maintain operation data such as bad block lists, mapping tables, and other data structures/tables to track the organization of user data in the non-volatile memory (e.g., NAND flash memory). Operation data is often stored by the controller in a volatile memory such as DRAM, with a backup version stored in the non-volatile memory. The persistent backup version allows for reconstruction in the volatile memory should data in the volatile memory becomes lost or corrupted (e.g., due to a power interruption and/or shutdown of the storage subsystem).

BRIEF DESCRIPTION OF THE DRAWINGS

Systems and methods which embody the various features of the invention will now be described with reference to the following drawings, in which:

FIG. 2B provides another example of the optimization scheme according to one embodiment.

DETAILED DESCRIPTION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Overview

Embodiments of the invention are directed to optimizing reconstruction of operation data in volatile memory of solid-state storage subsystems. In various embodiments, the solid-state storage subsystem stores operation data in the volatile memory with persistent backup data of the operation data in the non-volatile memory. For example, certain solid-state storage subsystems organize its memory blocks into groups of blocks (referred to as "superblocks" in this disclosure). Grouping blocks together for certain operations allow solid state drive designs to achieve maximum concurrency, as well as more efficient garbage collection and wear-leveling operations. In one embodiment, a superblock table is used in the storage subsystem to identify most or all of these groups of blocks (superblocks) within the storage device that certain firmware components operate on. Thus, the superblock table, along with other operation data such as mapping table and defect table, is critical for the storage device to function correctly.

In one embodiment, the superblock table is stored on its own superblock in the non-volatile memory, and thus is self-contained. Thus, it can be rebuilt in the volatile memory (e.g., DRAM) from scratch as soon as the physical location of the superblock is identified within the master boot record. This configuration does not rely on any other system data, and nor does it have to rely on any state information stored elsewhere. Therefore, the configuration is power-safe as a power-cycling event during an update to superblock table will both reconstruct properly with the difference of whether an updated entry exists or not.

Sometimes operation data in the volatile memory is lost or corrupted due to a power interruption or the solid-state storage subsystem shutting down in the normal course of operation. To optimize the reconstruction of the superblock table or other similar operation data tables/structures in the volatile memory upon recovery or restart, embodiments of the invention use a "snapshot entry" to identify the most updated physical locations of the portions of backup operation data (e.g., superblock table) and complete the reconstruction without needing to scan through all of the updates/entries stored in the non-volatile memory.

System Overview

Figure 1:
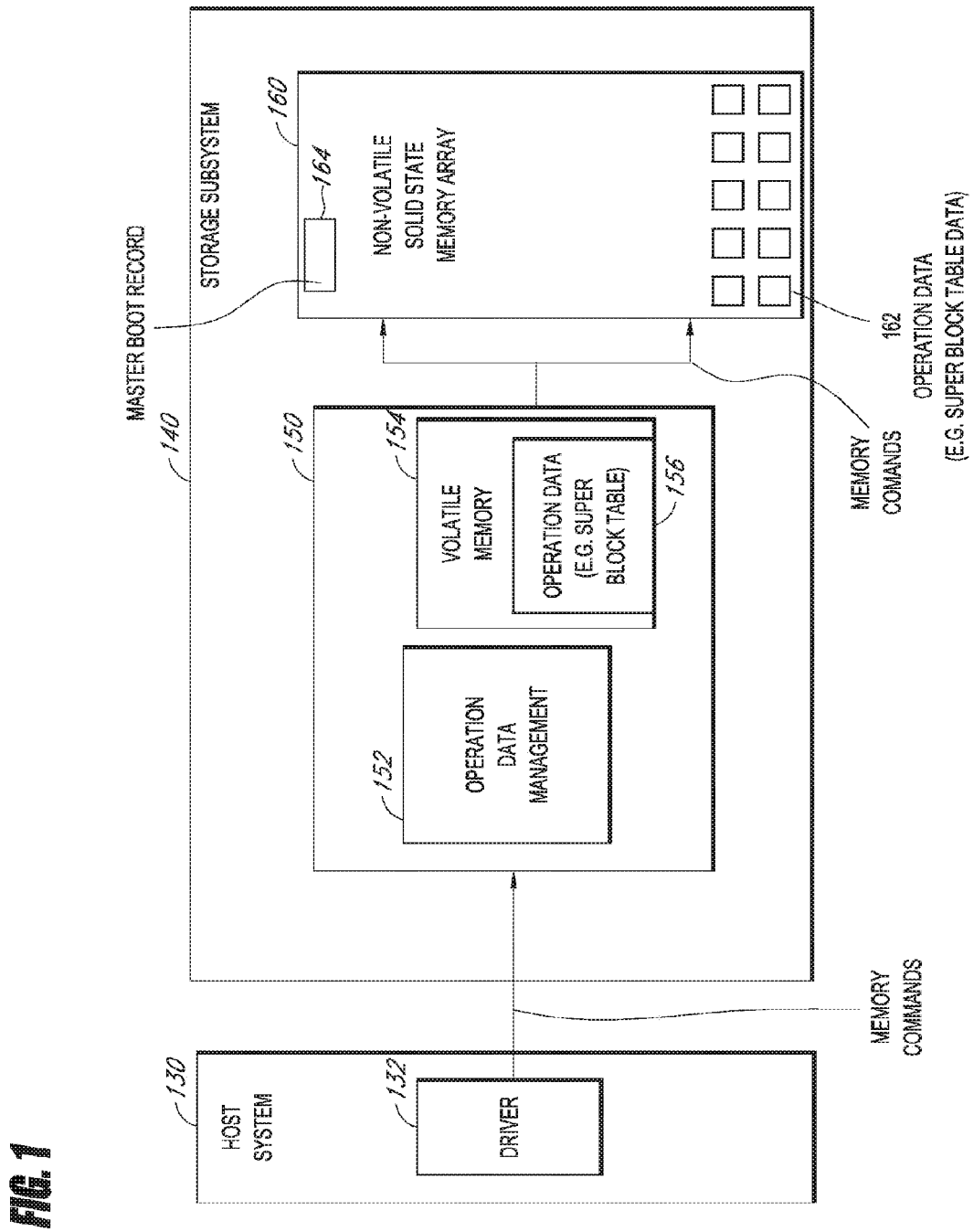
FIG. 1 is a block diagram illustrating a storage subsystem implementing a reconstruction optimization scheme for operation data according to one embodiment.

FIG. 1 is a block diagram illustrating a storage subsystem embodiment. As shown, a storage subsystem 140 includes a controller 150, which in turn includes an operation data management module 152 and a volatile memory 154 (e.g., DRAM, SDRAM). In some embodiments, the volatile memory may be outside of the controller 150 and in data communication with the controller 150. The operation data module in some embodiments performs the optimization methods described herein. In one embodiment, the controller 150 receives memory commands from a driver 132 residing within a host system 130, and in turns executes those memory commands in non-volatile solid-state memory arrays 160. To manage operation data, the controller in one embodiment stores one or more operation data structures (e.g., tables, lists, linked lists, arrays, etc.) in the volatile memory 154. In one embodiment, the operation data structures include a superblock table, as further described below. Although the superblock table example is used throughout this disclosure, the optimization methods disclosed herein are applicable to other operation data structures (e.g., mapping tables, defect tables, etc.). These operation data structures are updated as the controller processes memory commands from the host system and/or otherwise performs internal housekeeping operations. In one embodiment, portions of the operation data 156 (e.g., superblock table) are stored in the solid-state memory arrays 160 (shown as operation data 162) and can be used as persistent backup data to reconstruct the operation data when the data 156 in the volatile memory 154 is corrupted or lost (e.g., due to a power interruption or regular system shutdown). The persistent backup copy of the operation data 162 is periodically updated so that it corresponds to that which is stored in the volatile memory (data 156).

Superblock Table Examples

Figure 2A:
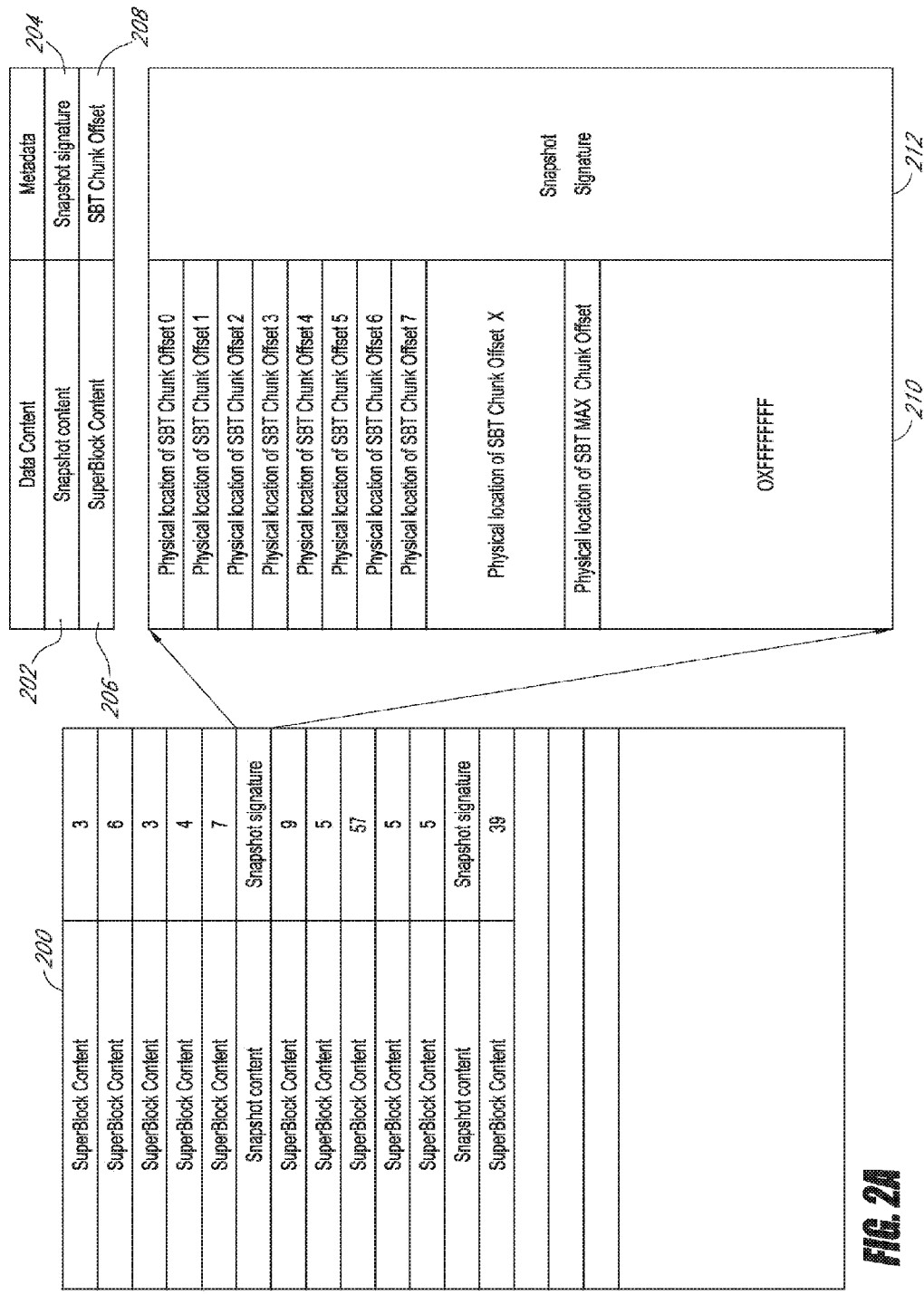
FIG. 2A shows an example scheme of maintaining operation data according to one embodiment.

FIG. 2A shows an example scheme of maintaining operation data according to one embodiment. Table 200 shows an example data arrangement for a superblock table in the non-volatile memory. The example table scheme shows two types of entry, a superblock content entry and a snapshot entry. As shown by the explanatory table in the upper right, each entry consists of a data content portion and a metadata portion. As such, a snapshot entry includes snapshot content 202 and a snapshot signature 204, and a superblock entry includes superblock content 206 and superblock table portion index (shown as chunk offset) 208. In the one embodiment, the superblock table can span from 64 to 512 4K-NAND pages depending on the capacity.

As shown in the table 200, each entry contains either (1) a portion of the superblock table (superblock content) and an index for that entry, or (2) a snapshot entry with a corresponding snapshot signature. For example, the first entry shows superblock table content indexed at chunk offset "3," while the second entry shows superblock table content indexed at chunk offset "6," and so on. In this example, the sixth entry is a snapshot entry, which is further depicted in a detailed view on the right. The snapshot content 210 of the snapshot entry contains physical memory locations of the superblock table portions, arranged in an ascending order by the chunk offset index. The snapshot signature 212 includes data that indicates that the corresponding content is a snapshot. The memory locations of the snapshot entry enable the controller to quickly locate relevant portions of the superblock table with a single read of the snapshot entry. The controller is thus spared from having to scan all entries to reconstruct the superblock table and can instead focus on reading just those entries created after the most recently created snapshot.

FIG. 2B provides an additional illustration of the use of snapshot entries for reconstruction purposes in one embodiment. FIG. 2B shows an example superblock table 222 in volatile memory such as DRAM. The example superblock table 236 in the volatile memory includes data portions A, B, C, D, and E. Listed to the right of the data portions are the corresponding physical addresses 238 of the data portions in the non-volatile memory.

The top of FIG. 2B shows how the superblock table data portions are stored in the non-volatile memory. The non-volatile memory illustration 220 shows a physical address column 230 (shown as Physical Chuck Number (PCN)), a data column 232, and spare area column 234. For example, in the first entry indicated, at physical address PCN 0, superblock table data portion "A" is stored. The spare area of that PCN 0 location stores a metadata label "A," which is equivalent to the index metadata shown in FIG. 2A. As the controller scans this address during reconstruction, this label identifies to the controller that what is being stored here is data portion "A." In the same manner, the second entry shows the storage of superblock table data portion "B" with the metadata label "B" in the spare area in PCN 1, and so on. These entries are written in chronological order as the superblock table data portions in the non-volatile memory are updated to match the superblock table in the volatile memory. As can be seen, the data portions "A," "B," "C," "D," and "E" are written initially in consecutive order in PCN 0, 1, 2, 3, 4.

Without a snapshot entry, if the power is lost at this point and the superblock table has to be reconstructed in the volatile memory, the controller in one embodiment would have to either start from the last entry written (PCN 4) or the first entry (PCN 0) and sequentially scan all the entries, possibly one at a time, to reconstruct the entire superblock table. For each entry, the controller would first look in the spare area to identify the metadata label and process the corresponding data portion accordingly. In practice, the entire superblock table may consist of thousands of such entries, so to scan all such entries during reconstruction may take a significant amount of time.

Embodiments of the invention provide snapshot entries to reduce the amount of scanning needed during reconstruction. As further shown in the non-volatile memory illustration 220, at PCN 5 is a snapshot entry that provides, in the data portion 232, a listing of physical memory addresses of the portions that make up the entire superblock table. As discussed above, a controller typically first reads the spare area for an entry during reconstruction. In the spare area here at PCN 5 is a snapshot signature that identifies to the controller that what is being stored at PCN 5 is a snapshot. Knowing now it is reading a snapshot, the controller would thus process the physical address information of the five entries in this example in order. Thus the controller can go directly to those physical address locations (PCN 1-5), read from those locations, and reconstruct the entire table without having to read through all the entries.

Embodiments of the invention provide further optimization by storing the location of the most recent snapshot entry in the master boot record. FIG. 2B shows the state of the volatile and non-volatile memory when power is interrupted. In this example, the master boot record would indicate that the most recent snapshot is at PCN 8, so the controller would first go there and read the snapshot to locate the data portions of the superblock table. The snapshot at PCN 8 indicates that portions "A," "B," "C," "D," and "E" are at PCN 7, 1, 2, 6, and 4, respectively. However, as shown in FIG. 2B, the actual locations for "A" and "C" have been updated since the creation of this snapshot. So in this example the controller would go forward to PCNs 9 and 10 to read more updated entries to include updates to data portions A and C at PCNs 9 and 10 to complete the reconstruction of superblock table. The controller is saved from having to read three entries to locate portions "B," "D," and "E." With the use of the snapshot in various embodiments of the invention, the number of entries the controller needs to scan is bounded by the frequency at which such snapshots are taken. If a snapshot is created as every 5th entry, the controller would at most have to read five entries (snapshot+4 updates) to reconstruct the table. This is a significant saving in time as compared to reading all the entries without the use of snapshots.

Managing Table Data

Figure 3:
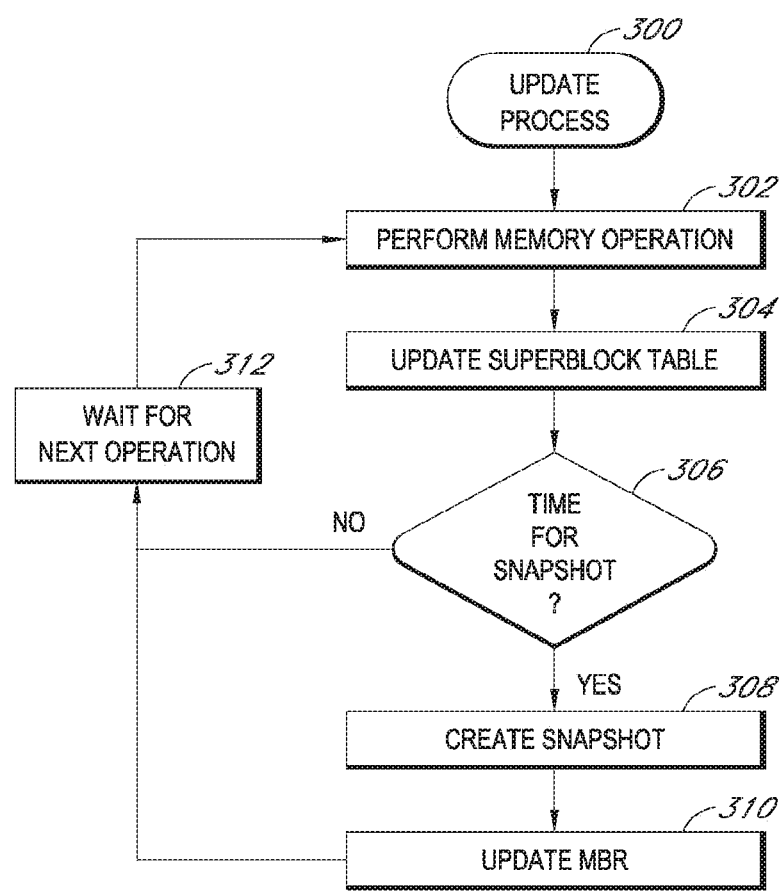
FIG. 3 is a flow diagram illustrating a method for updating operation data in a solid-state storage subsystem according to one embodiment.

FIG. 3 is a flow diagram illustrating a method 300 for updating operation data in a solid-state storage subsystem according to one embodiment. The method 300 may be performed by the controller 150 (or more specifically, the operation data management module 153 within the controller) in one embodiment. Although FIG. 3 describes the method in terms of a superblock table, the method is equally applicable to other type of operation data. In block 302, the controller begins performing a memory operation. The memory operation may necessitate an update to the superblock table, so in block 304, the controller updates the superblock table (both in the volatile memory and, if needed, in the non-volatile memory). Then in block 306, the controller determines whether it is time to record a snapshot in the non-volatile memory. If so, the controller creates a snapshot in block 308, and updates the master boot record in block 310. Otherwise, the controller returns to block 310 to wait for the next operation. As discussed above, the determination in block 306 may be based on a periodic schedule in which a snapshot is created after a pre-defined number of updates to the non-volatile memory. For example, the controller can be configured to create a snapshot after every 4th update. The number may be adjusted to minimize the effect of write amplification, which measures the number of memory operations triggered by user data write to the non-volatile memory. While a more frequently created snapshot can minimize scanning at the time of reconstruction, the snapshot frequency can be turned down to minimize the effect of write amplification (since a more frequently created snapshot adds to the number of write operations potentially triggered by a user data write). In one embodiment, the frequency can be adjusted by a host command or dynamically adjusted according to encoded firmware logic in the controller according to a desired balance of reconstruction optimization at power-up and write amplification effect.

Figure 4:
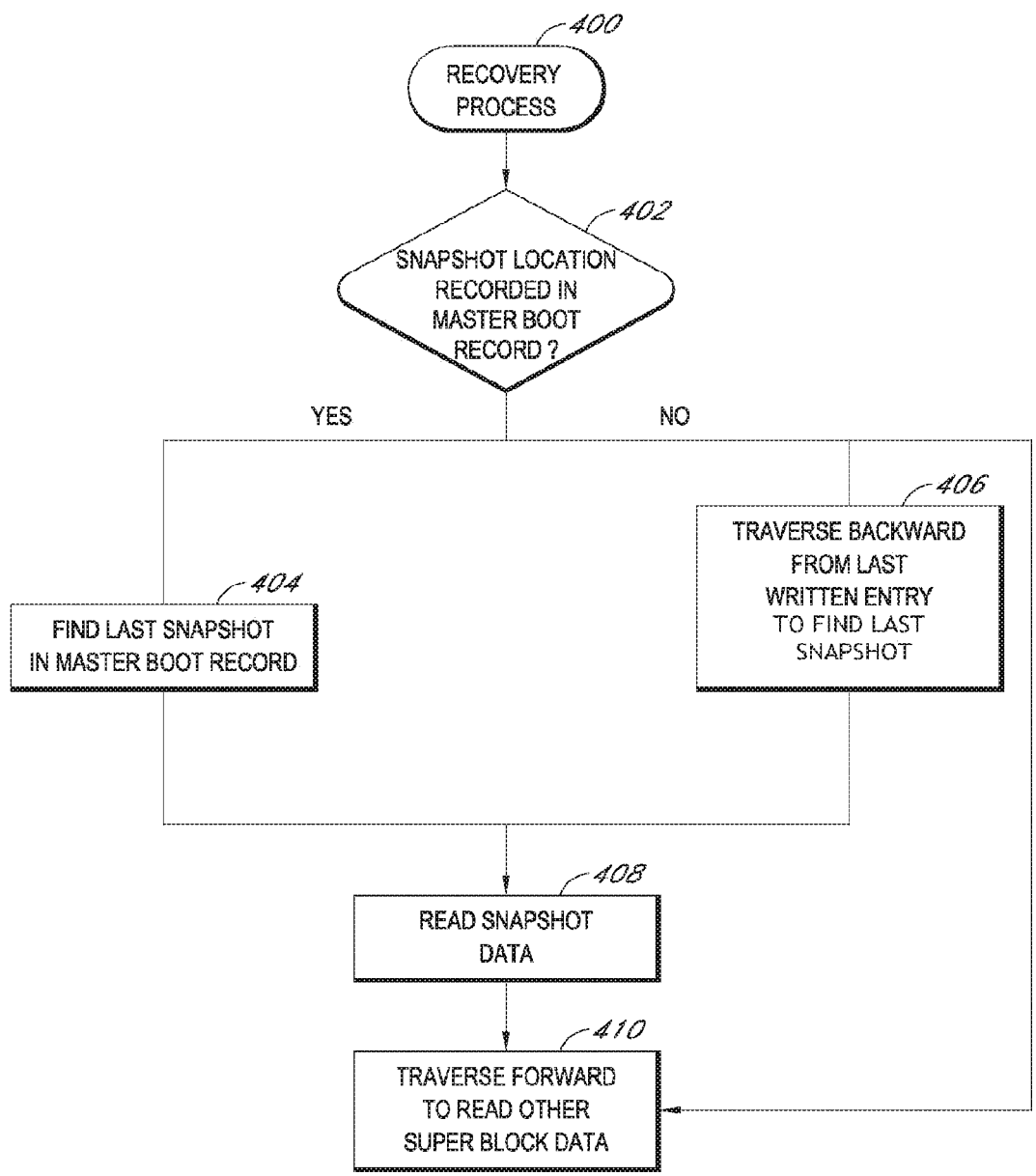
FIG. 4 is a flow diagram illustrating an operation data table recovery process according to one embodiment.

FIG. 4 is a flow diagram illustrating an operation data recovery process 400 according to one embodiment. Although FIG. 4 describes the method in terms of a superblock table, the method is equally applicable to other type of operation data. In one embodiment, the method 400 is performed by the controller 150 (or more specifically, the operation data management module 153 within the controller) to reconstruct the operation data (e.g., a superblock table) from persistent backup data portions stored in the non-volatile memory. In block 402, the controller 150 checks to see if the snapshot location is recorded in the master boot record. If so, the controller finds the most recently recorded snapshot using the location information in the master boot record in block 404. Once the most recently created snapshot is located, at block 408 the controller reads the snapshot data 408 to locate portions of the superblock table and begins the process of reconstruction. It then traverses forward along the entries to read other table data portions stored in the non-volatile memory as previously shown in FIG. 2B. If the snapshot location is not recorded in the master boot record, the controller can take one of two courses of action to reconstruct the table. First, the controller could traverse backward from the last written entry to locate the most recently created snapshot. Once it reaches the snapshot, it could then follow the same path in blocks 408 and 410. Second, the controller can start from the first entry and traverse forward to read all table data and reconstruct the table with the read entries.

In an alternate embodiment, the superblock table portions in the non-volatile memory may be reconstructed at a new location of the non-volatile memory to save space. Instead of using the snapshot to reconstruct the table in the volatile memory, the snapshot may be used to reconstruct a compacted version of the superblock table data so that outdated data may be discarded. For example, returning to FIG. 2B, it is noted that the non-volatile memory actually has saved three copies of superblock table portion "A," of which only the latest one at PCN 9 is the current one. Over the course of normal operation, the number of such entries (current and mostly outdated) may grow beyond the capacity of a superblock. In one embodiment, the snapshot optimized reconstruction process may be applied to reconstruct the table in a new location of the non-volatile memory with the current data only. For example, the reconstruction method may proceed substantially as depicted above in FIG. 4. Instead of reconstructing in the volatile memory, the controller can locate the current superblock table data portions using the latest snapshot and copy them to a new location in the non-volatile memory (e.g., another superblock) in the proper order. Once this is completed, the current superblock storing both current and outdated portions can be released for garbage collection, and the periodic snapshot creation process will proceed in the new superblock.

CONCLUSION

The features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method comprising:
    storing a first plurality of portions of a data table in a non-volatile memory array, at least one of the first plurality of portions including an update to the data table;
    creating a snapshot of the first plurality of portions comprising information related to physical memory locations in which the at least one of the first plurality of portions is stored at a time of creation of the snapshot;
    storing a second plurality of portions of the data table in the non-volatile memory array, the second plurality of portions of the data table including updates to the data table that occurred after the time of creation of the snapshot; and
    locating, based on the snapshot, one of the first plurality of portions of the data table in the non-volatile memory array,
    traversing from the snapshot forward to locate the second plurality of portions of the data table, and
    reconstructing the data table using the located one of the first plurality of portions and the second plurality of portions.

2. The method of claim 1, wherein the snapshot comprises data related to a physical location of each data table portion stored in the non-volatile memory array.

3. The method of claim 2, wherein the snapshot comprises information related to a data signature for the physical location data.

4. The method of claim 3, wherein the data signature identifies the physical location data of each data table portion as snapshot data to be used for reconstructing the data table.

5. The method of claim 1, further comprising storing the snapshot in a master boot record of the non-volatile memory array.

6. The method of claim 1, further comprising creating another snapshot after a predetermined number of data table portions are stored in the non-volatile memory array.

7. The method of claim 6, further comprising determining the predetermined number based at least in part on a predetermined amount of write amplification.

8. The method of claim 1, wherein locating the one of the first plurality of portions of the data table comprises locating the one of the first plurality of portions of the data table in response to a power loss event.

9. The method of claim 1, wherein storing the first plurality of portions comprises storing the first plurality of portions in a first superblock comprising current and outdated portions of the data table.

10. The method of claim 9, further comprising:
recreating an updated copy of the data table in a second superblock; and
releasing the first superblock for garbage collection.

11. An apparatus comprising:
a non-volatile memory array;
a volatile memory configured to store a data table;
a controller configured to:
store a first plurality of portions of the data table in the non-volatile memory array, at least one of the first plurality of portions including an update to the data table;
create a snapshot of the first plurality of portions comprising information related to physical memory locations in which the at least one of the first plurality of portions is stored at a time of creation of the snapshot;
store a second plurality of portions of the data table in the non-volatile memory array, the second plurality of portions of the data table including updates to the data table that occurred after the time of creation of the snapshot; and
locate, based on the snapshot, one of the first plurality of portions of the data table in the non-volatile memory array,
traverse from the snapshot forward to locate the second plurality of portions of the data table, and
reconstruct the data table using the located one of the first plurality of portions and the second plurality of portions.

12. The apparatus of claim 11, wherein the snapshot comprises data related to a physical location of each data table portion stored in the non-volatile memory array.

13. The apparatus of claim 12, wherein the snapshot comprises information related to a data signature for the physical location data.

14. The apparatus of claim 11, wherein the controller is further configured to store the snapshot in a master boot record of the non-volatile memory array.

15. The apparatus of claim 11, wherein the controller is further configured to create another snapshot after a predetermined number of data table portions are stored in the non-volatile memory array.

16. The apparatus of claim 15, wherein the controller is further configured to determine the predetermined number based at least in part on a predetermined amount of write amplification.

17. The apparatus of claim 11, wherein the controller is further configured to locate the one of the first plurality of portions of the data table in response to a power loss event.

18. The apparatus of claim 11, wherein the controller is further configured to store the first plurality of portions in a first superblock comprising current and outdated portions of the data table.

19. A non-transitory computer readable medium having executable instructions operable to cause a memory controller in a storage system to:
store a first plurality of portions of a data table in a non-volatile memory array, at least one of the first plurality of portions including an update to the data table;
create a snapshot of the first plurality of portions comprising information related to physical memory locations in which the at least one of the first plurality of portions is stored at a time of creation of the snapshot;
store a second plurality of portions of the data table in the non-volatile memory array, the second plurality of portions of the data table including updates to the data table that occurred after the time of creation of the snapshot; and
locate, based on the snapshot, one of the first plurality of portions of the data table in the non-volatile memory array,
traverse from the snapshot forward to locate the second plurality of portions of the data table, and
reconstruct the data table using the located one of the first plurality of portions and the second plurality of portions.

20. The computer readable medium of claim 19, further comprising executable instructions operable to cause the memory controller to locate the one of the first plurality of portions of the data table in response to a power loss event.

* * * * *